United States Patent [19]

Singer

[11] Patent Number: 4,883,308
[45] Date of Patent: Nov. 28, 1989

[54] SINGLE SEATER MOTOR VEHICLE

[75] Inventor: Norbert Singer, Vaihingen, Fed. Rep. of Germany

[73] Assignee: Dr. Ing. h.c.F. Porsche AG, Stuttgart, Fed. Rep. of Germany

[21] Appl. No.: 239,397

[22] Filed: Sep. 1, 1988

[30] Foreign Application Priority Data

Sep. 4, 1987 [DE] Fed. Rep. of Germany ....... 3729558

[51] Int. Cl.$^4$ .............................................. B60R 27/00
[52] U.S. Cl. ................................................... 296/185
[58] Field of Search ............................... 296/180.1, 185

[56] References Cited

U.S. PATENT DOCUMENTS 4,455,045 6/1984 Wheeler ........................ 296/180.1 X

FOREIGN PATENT DOCUMENTS

| 3410296 | 9/1985 | Fed. Rep. of Germany ... 296/180.1 |
| 1432646 | 2/1966 | France .............................. 296/180.1 |
| 2363472 | 3/1978 | France .............................. 296/180.1 |
| 2594497 | 9/1987 | France .............................. 296/180.1 |
| 485712 | 12/1954 | Italy ................................. 296/180.1 |

Primary Examiner—Robert R. Song
Assistant Examiner—Gary C. Hoge
Attorney, Agent, or Firm—Barnes & Thornburg

[57] ABSTRACT

A single seater motor vehicle is disclosed which has freely exposed wheels and a centrally disposed base body bounded on the sides by lateral body section. The base body is tapered so as to have an aerodynamic shape with a widest section as seen from the top adjacent the rear vehicle wheels and a widest section width as seen from the bottom adjacent the front vehicle wheels. The lateral body sections extend from adjacent the vehicle front wheels and include openings for vehicle engine radiators.

20 Claims, 5 Drawing Sheets

SINGLE SEATER MOTOR VEHICLE

BACKGROUND AND SUMMARY OF THE INVENTION

The present invention relates to a single seater motor vehicle with essentially exposed wheels and an aerodynamically shaped body extending in the vehicle longitudinal direction and resembling an aircraft body, which is formed by a base body of a cross section at least sectionwise approximately in the shape of a door arch and having negative lift surfaces provided in the front and rear and extending transversely to the vehicle longitudinal direction and with lateral bodies of approximately rectangular cross section.

A known single seater motor vehicle (U.S. Des. Pat. No. 253,605) includes a base body in which lateral bodies extend adjacent the longitudinal sides of the base body. Additionally, the base body is provided with a front section which extends from the front wheels over the essential width of the vehicle.

It is the object of the present invention to provide a single seater motor vehicle, at the body of which are provided aerodynamic devices which not only improve the negative lift of the motor vehicle but also its air-resistance coefficient.

The underlying problems are solved according to the present invention in that the base body—as viewed in top plan view—has a configuration tapering toward the front and rear in such a manner that it possesses its greatest width on a transverse plane located between the wheel axes but adjacent the rear wheels, in that the base body—as viewed in bottom plan view—has a configuration tapering toward the front and rear in such a manner that it possesses its greatest width in a cross plane within the area of the front wheels, in that the base body includes a boundary wall at its bottom side that extends parallel to the road surface, and more particularly, over a substantial partial area of this bottom side, in that the lateral bodies are provided at their bottom sides adjacent the front wheels with concave guide sections which lead away from horizontal boundary walls, in that the boundary walls are continued at the bottom side of the lateral bodies to the rear of the guide sections, on the one hand, horizontally up to the rear wheels and, on the other, as through-flow channels, in that the through-flow channels rise from the boundary walls and extend inside of the rear wheels, and in that the lateral bodies are constructed above the inlet openings in the manner of a wing profile.

The principal advantages achieved with the present invention reside in that, on the one hand, a good negative lift for improving the driving behavior of the motor vehicle is achieved by the different aerodynamic body arrangements and, on the other, its air resistance coefficient is relatively low.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
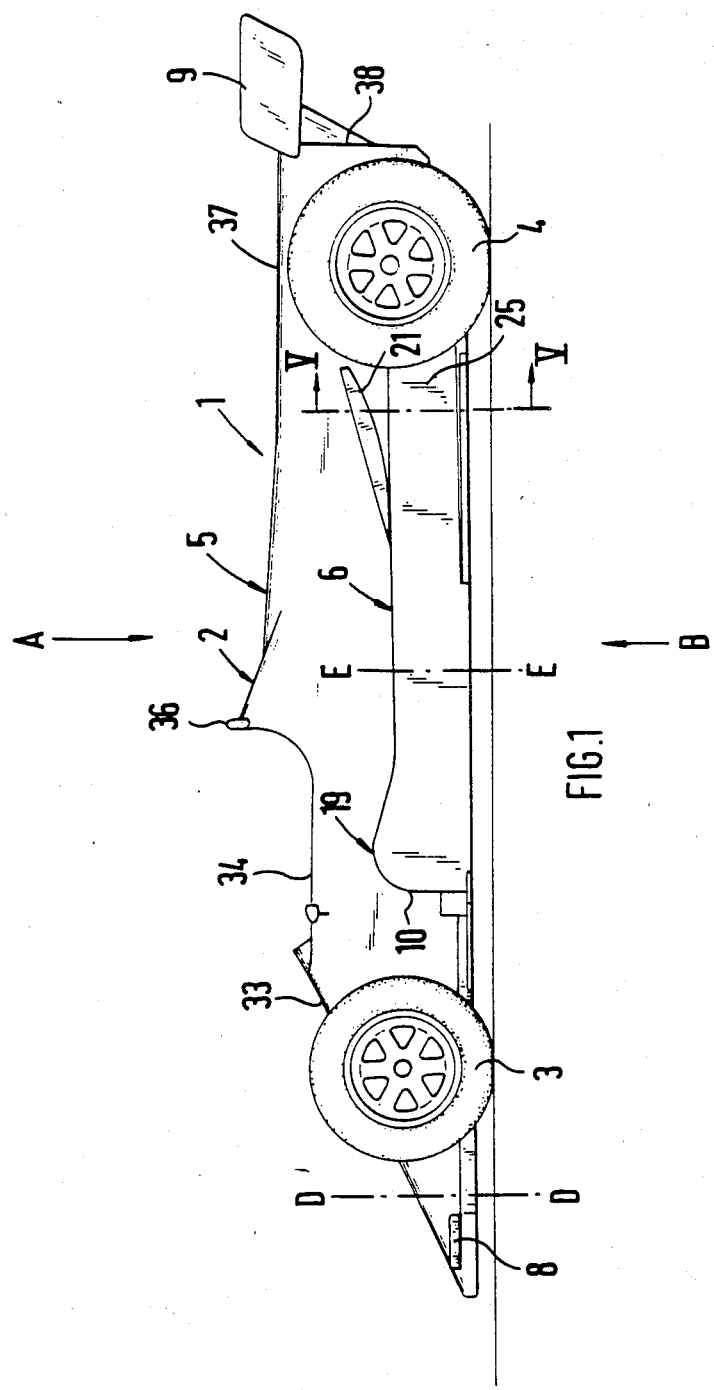
FIG. 1 is a side view of a one seater motor vehicle in accordance with the present invention.

Referring now to the drawing wherein like reference numerals are used throughout the various views to designate like parts, the single seater motor vehicle 1 includes a body 2 which is carried by the front wheels 3 and the rear wheels 4; all wheels are freely exposed, i.e., are not covered. A multi-cylinder internal combustion engine (not shown) serves for the drive of the motor vehicle 1 which is arranged between the front wheels 3 and the rear wheels 4, however, adjacent to the latter.

The body 1 resembles an aircraft body, i.e., is of a streamlined type and is formed by a base body 5 covering the internal combustion engine and lateral bodies 6 and 7 attached thereon. The base body 5 extends symmetrically to a vehicle longitudinal center plane C—C (FIG. 3), whereby the lateral bodies 6 and 7 extend along the longitudinal sides of the base body 5. The lateral bodies 6 and 7 extend therefore between the front wheels 3 and the rear wheels 4 and have a lesser height than these wheels.

Figure 2:
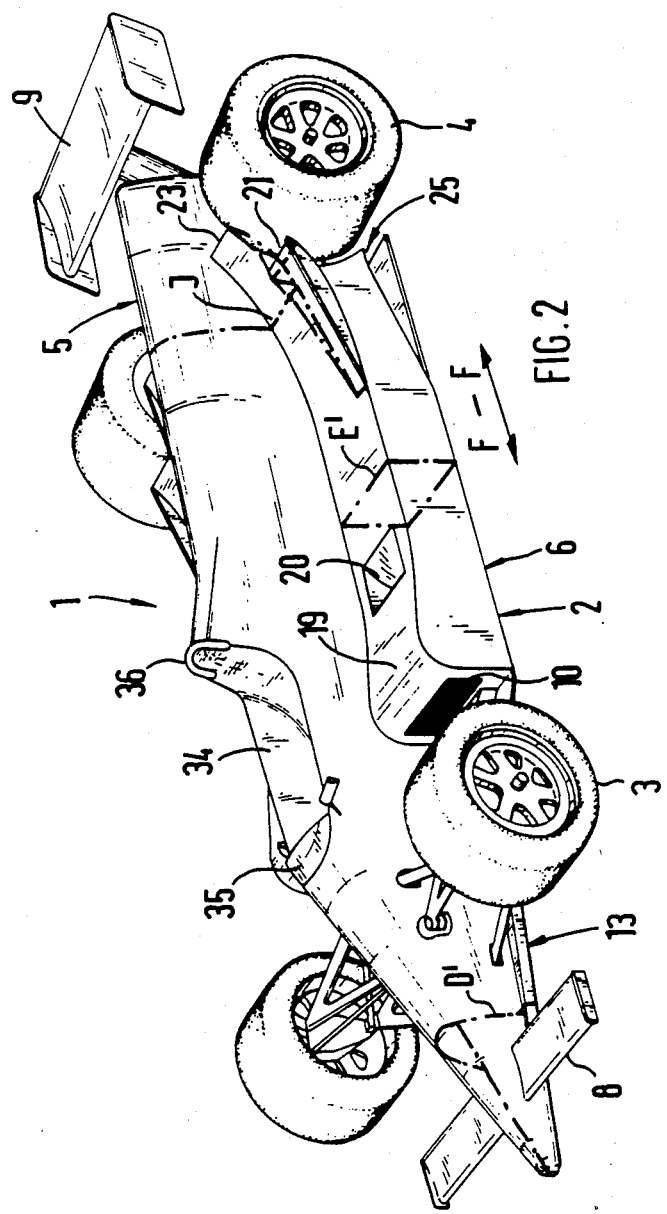
FIG. 2 is a perspective view from the left front of the single seater motor vehicle in accordance with the present invention.

In FIG. 1, vertical cross-sectional lines D—D and E—E are shown which, in FIG. 2, can be recognized as cross-sectional lines D' and E'. They illustrate that the base body has at least shapewise a cross section in the shape of a door arch; the lateral bodies 6 and 7, by contrast, have a rectangular cross section. Additionally, the base body 5 is provided in the front section and rear section with negative lift surfaces 8 and 9 which are constructed wing-like (air foil-like) and extend transversely to the vehicle longitudinal direction F—F. Adjacent the front wheels 3, the lateral bodies 6 and 7 are provided with inlet openings 10 and 11 behind which are provided radiators (not shown) of the internal combustion engine.

Figure 3:
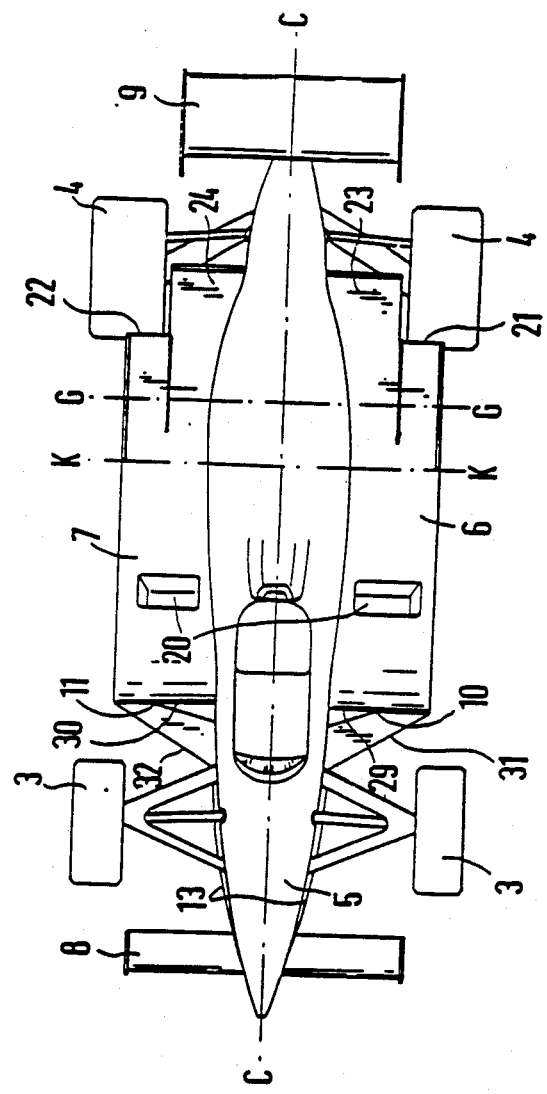
FIG. 3 is a top plan view taken in the direction of arrow A of FIG. 1, on a smaller scale.
Figure 4:
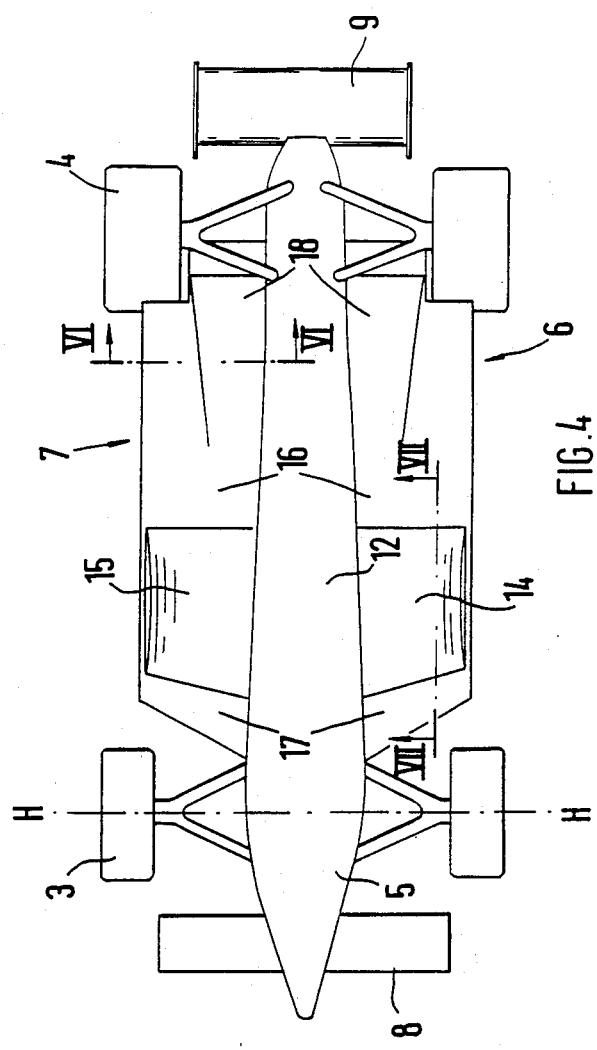
FIG. 4 is a bottom plan view taken in the direction B of FIG. 1, on a smaller scale.

According to FIG. 3, the base body includes, as viewed in top plan view, a configuration tapering toward the front and rear, whereby the base body 5 has its greatest width in a cross plane G—G adjacent the rear wheels 4. As viewed in bottom plan view, the greatest width of the base body 5 is within the area of the cross plane H—H which extends between the front wheels 3 (FIG. 4). Therebeyond, the base body 5 is provided at its bottom side with a boundary wall 12 which is aligned parallel to the road surface over a considerable area thereof. The base body 5 is also provided at its bottom side within the area of the front wheels 3 with web-like lateral enlargements 13. Stated differently, these enlargements 13 protrude laterally beyond the base body 5.

Figure 6:
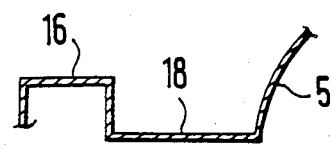
FIG. 6 is a cross-sectional view taken along line VI—VI of FIG. 4, rotated through 180°.
Figure 7:
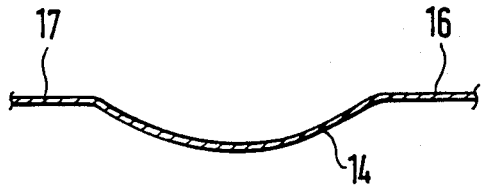
FIG. 7 is a cross-sectional view taken along line VII—VII of FIG. 4.

According to FIGS. 4 and 7, the lateral bodies 6 and 7 are equipped at their bottom side adjacent the front wheels 3 with concave arcuately shaped guide sections 14 and 15 which extend away from the horizontal boundary walls 16 and 17. To the rear of these guide sections 14 and 15, the boundary walls 16 are continued horizontally, on the one hand, and are continued as through-flow channels 18, on the other, which extend inside of the rear wheels 4 (FIG. 6).

Above the inlet openings 10 and 11, the lateral bodies 6 and 7 are constructed in the manner of a wing profile, whereby outlet openings 20 are provided not far from this profile, and more particularly for the air flowing through the radiators.

In front of the rear wheels 4, the lateral bodies 6 and 7 which are exceeded as regards height by the wheels 4, are provided with first guide devices 21 and 22. The first guide devices 21 and 22 are aligned approximately in the radial direction to the outer circumferential line of the wheels 4. Two second guide devices 23 and 24 are provided inside of the first guide devices 21 and 22 which extend stepped to the first guide devices 21 and 22—see line J, FIG. 2. According to FIG. 3, these second guide devices 23 and 24 terminate—as viewed in top plan view—on a cross plane which includes a center line of the rear wheels 4.

Figure 5:
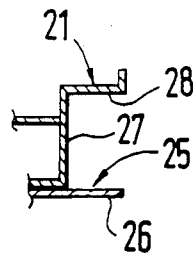
FIG. 5 is a cross-sectional view taken along line V—V of FIG. 1.

The lateral bodies 6 and 7 are provided within the rear area at their outside with channels 25 U-shaped in cross section (FIGS. 2). These channels 25 are formed by a horizontal section 26 at the bottom side, a vertical wall 27 of the lateral body 6 and by a further horizontal section 28 of the first guide device 21 (FIG. 5). The U-shaped channels 25 begin at a cross plane K—K at the outside of the lateral bodies 6 (FIG. 3), whereby the vertical wall 27 extends from there in the direction toward the base body 5 and terminates inside of the rear wheels 4 (FIG. 2).

The lateral bodies 6 and 7 are aligned with their forward terminal parts 29 and 30 approximately parallel to the running (tread) surface of the front wheels 3, whereby guide devices 31 and 32 are provided within this area at the bottom side of the lateral bodies. The guide devices 31 and 32 are in the shape of an arrow (swept-back) as viewed from above (FIG. 3), i.e., their forward boundaries extend opposite the driving direction obliquely and particularly from inwardly in front toward the rear outwardly. According to FIG. 1, the front wheels 3 protrude beyond the obliquely dropping front contour 33 which within the area of the driver seat that is delimited by a cut-out 34, is provided with a relatively small windshield 35. At 36 a roll-over bar is indicated from which the upper boundary wall 37 of the base body 5 initially drops somewhat in the direction toward the road surface. Within the area of the rear wheels 4 the upper boundary 37—which is slightly higher than the rear wheels 4—is horizontally aligned whereby it is continued up to a vertical rear termination 38 to the area of the rear wheels 4.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A single seater motor vehicle with essentially freely exposed wheels, comprising a streamlined body extending in the vehicle longitudinal direction and resembling an aircraft body, the streamlined body including a base body means of a cross section at least shapewise approximately in the shape of a door arch and having negative lift surface means extending transversely to the vehicle longitudinal direction provided in the front and rear and lateral body means of approximately rectangular cross section, the lateral body means being provided adjacent the front wheels with inlet openings for radiators of an internal combustion engine, the internal combustion engine being arranged covered by the base body means between the front wheels and rear wheels but more adjacent the rear wheels, the base body means having—as viewed in top plan view—a configuration tapering toward the front and rear in such a manner that it has its greatest width in a cross plane between the wheel axes but adjacent the rear wheels, the base body means having—as viewed in bottom plan view—a configuration tapering toward the front and rear in such a manner that it has its largest width in a cross plane within the area of the front wheels, the base body means including at its bottom side a boundary wall that extends substantially parallel to the road surface over a considerable partial area of this bottom side, the lateral body means being provided at their bottom sides adjacent the front wheels with concave guide sections which extend away from substantially horizontal boundary wall means, the boundary wall means being continued at the bottom side of the lateral body means to the rear of the guide sections, on the one hand, horizontally up to the rear wheels and, on the other, being continued as through-flow channels, the through-flow channels rising from the boundary wall means and extending inside of the rear wheels, and the lateral body means being constructed in the manner of a wing profile above the inlet openings.

2. A single seater motor vehicle according to claim 1, wherein the lateral body means include adjacent the rear wheels first guide means which are aligned approximately in the radial direction to the outer circumferential line of the rear wheels.

3. A single seater motor vehicle according to claim 2, wherein the lateral body means include inside of the first guide means, second guide means which extend stepped with respect to the first guide means and which terminate—as viewed in top plan view—in a cross plane that includes the center cross plane of the rear wheels.

4. A single seater motor vehicle according to claim 2, wherein the lateral body means have U-shaped channel means along their outside in the rear area which are formed by horizontal sections of the boundary wall means at the bottom side, vertical walls of the lateral body means and horizontal sections of the first guide means.

5. A single seater motor vehicle according to claim 4, wherein the U-shaped channel means begin approximately adjacent a cross plane extending between the front wheels and the rear wheels, the vertical walls of the lateral body means terminating inside of the rear wheels.

6. A single seater motor vehicle according to claim 1, wherein the lateral body means are aligned adjacent the front wheels approximately parallel to the running surface of the front wheels.

7. A single seater motor vehicle according to claim 6, wherein the lateral body means are provided adjacent the front wheels at their bottom sides with guide means whose forward boundary—as viewed in top plan view—extend opposite the driving direction obliquely from inwardly in front toward the rear outwardly.

8. A single seater motor vehicle according to claim 1, wherein the lateral body means include outlet openings at their top side which, as viewed in the vehicle longitudinal direction, are arranged at a small distance to the inlet openings.

9. A single seater motor vehicle according to claim 1, wherein, as viewed in side view, the upper boundary of the base body means is aligned substantially horizontally in the area of the rear wheels and is continued to the rear of these rear wheels up to a substantially vertical rear termination.

10. A single seater motor vehicle according to claim 1, wherein the base body means includes at its bottom side within the area of the front wheels web-like enlargements extending laterally beyond the longitudinal sides.

11. A single seater motor vehicle according to claim 5, wherein the lateral body means include inside of the first guide means, second guide means which extend stepped with respect to the first guide means and which terminate—as viewed in top plan view—in a cross plane that includes the center cross plane of the rear wheels.

12. A single seater motor vehicle according to claim 9, wherein the base body means includes at its bottom side within the area of the front wheels web-like enlargements extending laterally beyond the longitudinal sides.

13. A single seater motor vehicle according to claim 9, wherein the lateral body means are provided adjacent the front wheels at their bottom sides with guide means whose forward boundary—as viewed in top plan view—extend opposite the driving direction obliquely from inwardly in front toward the rear outwardly.

14. A single seater motor vehicle according to claim 13, wherein the lateral body means include adjacent the rear wheels first guide means which are aligned approximately in the radial direction to the outer circumferential line of the rear wheels.

15. A single seater motor vehicle according to claim 14, wherein the lateral body means include inside of the first guide means, second guide means which extend stepped with respect to the first guide means and which terminate—as viewed in top plan view—in a cross plane that includes the center cross plane of the rear wheels.

16. A single seater motor vehicle according to claim 15, wherein the lateral body means have U-shaped channel means along their outside in the rear area which are formed by horizontal sections of the boundary wall means at the bottom side, vertical walls of the lateral body means and horizontal sections of the first guide means.

17. A single seater motor vehicle according to claim 16, wherein the U-shaped channel means begin approximately adjacent a cross plane extending between the front wheels and the rear wheels, the vertical walls of the lateral body means terminating inside of the rear wheels.

18. A single seater motor vehicle according to claim 12, wherein the lateral body means are aligned adjacent the front wheels approximately parallel to the running surface of the front wheels.

19. A single seater motor vehicle according to claim 18, wherein the lateral body means include outlet openings at their top side which, as viewed in the vehicle longitudinal direction, are arranged at a small distance to the inlet openings.

20. A single seater motor vehicle according to claim 1, wherein the lateral body means are provided adjacent the front wheels at their bottom sides with guide means whose forward boundary—as viewed in top plan view—extend opposite the driving direction obliquely from inwardly in front toward the rear outwardly.

* * * * *